(12) United States Patent  
Cook, Jr. et al.

(10) Patent No.: US 8,370,214 B2
(45) Date of Patent: *Feb. 5, 2013

(54) INTERACTIVE EXPLODED VIEW DIAGRAM ORDERING TOOL

(75) Inventors: Harold Thomas Cook, Jr., Bainbridge Island, WA (US); Keith David Fetterman, Bainbridge Island, WA (US); David Earl White, Bainbridge Island, WA (US)

(73) Assignee: Mariner Supply, Inc., Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,027

(22) Filed: May 7, 2012

(65) Prior Publication Data

US 2012/0221438 A1 Aug. 30, 2012

Related U.S. Application Data

(63) Continuation of application No. 10/480,326, filed as application No. PCT/US02/18662 on Jun. 11, 2002, now Pat. No. 8,175,933.

(60) Provisional application No. 60/298,719, filed on Jun. 11, 2001.

(51) Int. Cl.
G06Q 30/00 (2012.01)
G06F 17/30 (2006.01)

(52) U.S. Cl. ...................................... 705/26.5; 705/27.1
(58) Field of Classification Search ................. 705/26.5, 705/27.1
See application file for complete search history.

(56) References Cited

U.S. PATENT DOCUMENTS

| | | |
|---|---|---|
| 6,076,091 A | 6/2000 | Fohn |
| 6,901,377 B1 | 5/2005 | Rosenfeld |
| 6,985,876 B1 | 1/2006 | Lee |
| 2001/0027429 A1 | 10/2001 | Uemura |
| 2001/0044749 A1 | 11/2001 | Heisler |
| 2002/0087423 A1 | 7/2002 | Carbrey |

OTHER PUBLICATIONS

ARI Network Services, www.Arinet.com, available at www.waybackmachine.org, captured Mar. 22, 2000, 10 pages.
"ecomparts.com Launches One-Stop Replacement Parts Source for Commercial Kitchen Equipment Users," Business Wire, New York, Jun. 1, 2000, <http://proquest.umi.com/pqdweb?Did=00000...2&Fmt=3&Deli=1&Mtd=1&Idx=9&Sid=6&RQT=309> [retrieved Sep. 12, 2002], 2 pages.
Enigma E-Publishing Solutions, www.Enigma.com, available at www.waybackmachine.org, captured May 10, 2000, and Mar. 24, 2000, 18 pages.

(Continued)

*Primary Examiner* — Amee A Shah
(74) *Attorney, Agent, or Firm* — Christensen O'Connor Johnson Kindness PLLC

(57) ABSTRACT

The present invention provides a method and computer-readable medium for executing a method of placing an order for a sub-component (part) of a product, including generally three steps: displaying a diagram depicting sub-components of a product in an exploded view on a user screen; receiving a user selection of a sub-component to be ordered; and processing the selection of a sub-component to be ordered. Optionally, the method may allow the user to selectively view further information pertinent to displayed sub-components, such as their prices and specifications, or to selectively zoom in on and zoom out of the exploded view or to scroll the exploded view. The method thus assists the user when attempting to identify and/or order a sub-component for the product. The method may also be implemented in a stand-alone computer system.

44 Claims, 11 Drawing Sheets

OTHER PUBLICATIONS

"International IT Company Gears Up for Global Shift Towards eCommerce," Business Wire, New York, Nov. 11, 1999, <http://proquest.umi.com /pqdweb?Did=00000...&Fmt=3&Deli=1&Mtd=1&Idx=12&Sid=6&RQT=309> [retrieved Sep. 12, 2002], 3 pages.

Russo, E., "Supply Chain; Cooperative Turns to Web for Competitive Advantage," Omaha World—Herald, Omaha, Nebraska, Nov. 10, 1999, <http://proquest.umi.com/pqdweb?Did=00000...&Fmt=3&Deli=1&Mtd =1&Idx=13&Sid=6&RQT=309> [retrieved Sep. 12, 2002], 3 pages.

Schechter, M., et al., "E-Commerce: Who's really making it work?" Foodservice Equipment & Supplies 53(9):37-42, Aug. 2000, <http://proquest.umi.com/pqdweb?Did=00000...5&Fmt=3&Deli=1&Mtd=1&Idx=2&Sid=5&RQT=309> [retrieved Sep. 12, 2002].

Statalla, Michelle, "Web at Your Back, Wrench in Your Hand," New York Times (Late Ed., East Coast), New York, May 17, 2001, 3 pages.

"The online parts source for the food service equipment industry," ecomparts.com, <http://web.archive.org/web/20000412194354/ecomparts.com/home.html> [retrieved Sep. 12, 2002].

"Visual Configurator System for Configuring and Ordering IBM Products," IBM Technical Disclosure Bulletin, Jun. 1, 1992, vol. 35, Issue 1A, pp. 368-371.

INTERACTIVE EXPLODED VIEW DIAGRAM ORDERING TOOL

CROSS-REFERENCE(S) TO RELATED APPLICATION(S)

This application is a continuation of application Ser. No. 10/480,326, filed Jul. 13, 2004, which is a National Phase of International Application No. PCT/US02/18662, filed Jun. 11, 2002, which claims the benefit of Provisional Application No. 60/298,719, filed Jun. 11, 2001, the entire disclosures of which are hereby incorporated by reference herein.

FIELD OF THE INVENTION

The present invention relates generally to a computer method and system for placing an order, and more particularly, to a method and system for ordering sub-component(s) of a product, assisted by an exploded view of the product showing the sub-components.

BACKGROUND OF THE INVENTION

When ordering a replacement part for a product or component of equipment when the part number is not known or is in question, the traditional approach includes using two or three tools to accomplish locating and ordering the part. The customer or salesperson at the parts counter needs to first find a materials list, or parts listing table or parts list, that associates the part with the product. Oftentimes, a book or microfiche needs to be referred to for a drawing or picture of the product that depicts the various pieces of the product in an unassembled state with the parts arranged in relative positions with respect to how they are arranged once the product is assembled. This drawing or picture is commonly referred to as the "exploded view" of the product, since it usually appears as if the product has been expanded or "exploded" apart, with the parts still in the same relative position to each other, except moved apart to be able to better distinguish individual characteristics of the parts. This view of the product is oftentimes the same as the assembly drawing that is used to assemble the product, since it clearly depicts how the parts are arranged in order to assemble the product. Each part in an exploded view is usually labeled with a "key" number, or "piece" number (different from the part number), which is used to associate each part to a materials list. A materials list lists the key number together with the corresponding part number, description, and other pertinent information concerning each part in a table format.

Consulting the product's exploded view will usually confirm where a part is located with respect to the other parts in the product, and is very useful for trying to identify a replacement part and its part number. To do this, a person has to first determine the key number of a desired part from the exploded view, then find the key number on the materials list to find its corresponding part number, and then, oftentimes, also consult a separate price list for the price of the desired part. Therefore, once the part is located via the exploded view, the part number or key number is used to locate the part in a price list or point of sale system to determine the price of the part. Thereafter, an order form is filled out or the part is entered into the point of sale or purchasing system.

In a similar manner, parts are sometimes first selected from a materials list or parts list, and then with the part number or key number, the exploded view examined to confirm that it is the correct part to be ordered or purchased. Either way, there are multiple documents that need to be used to identify a desired part and place an order; furthermore, the process needs to be repeated for each part being ordered.

SUMMARY OF THE INVENTION

The present invention provides a method and a computer-readable medium for executing a method of placing an order for a sub-component of a product. The method includes generally three steps: displaying a diagram depicting sub-components of a product in an exploded view on a screen, for example, of a client system; receiving a user selection of a sub-component to be ordered from the client system; and processing the selection of a sub-component to be ordered. Optionally, the method may allow the user to selectively zoom in on and zoom out of the exploded view, or selectively scroll the exploded view, so as to better view any desired sub-components. The method is particularly suited for application on a network, such as the Internet.

In accordance with one aspect of the present invention, the method may further include the step of selectively displaying information concerning a sub-component in the diagram on the client system in response to a user input identifying the sub-component. This feature is helpful in further assisting the user in determining the characteristics of, and making a purchasing decision about, any sub-component depicted in the diagram. The information that can be displayed may include any one or more of the following: (a) a picture or photograph of the sub-component; (b) a key number of the sub-component; (c) an identification number of the sub-component; (d) a replacement/substitute identification number of the sub-component; (e) a description of the sub-component; (f) specifications/materials of the sub-component; (g) a manufacturer/supplier of the sub-component; (h) a manufacturer identification number of the sub-component; (i) a stock-keeping-unit (SKU) number of the sub-component; (j) the quantity of the sub-component(s) used in the product; (k) other sub-components associated with the selected sub-component as part of a kit; (l) the price of the sub-component; (m) the price of the product as a whole; (n) the availability of the sub-component; (o) available varieties of the sub-component; (p) an order icon for ordering the sub-component; and (q) a menu listing one or more pieces of information selected from the group consisting of information items (a)-(p) above. When a menu listing one or more pieces of information is displayed, the method also displays a selected piece of information in response to the user selection of one piece of information among information items (a) through (o), or processes the selection of a sub-component to be ordered in response to the user selection of information item (p). The user selection of information may be carried out by a user activating a pointing device, such as a computer mouse, stylus, etc., with respect to the sub-component concerning which further information is requested.

Similarly, the user selection of a sub-component to be ordered (purchased) may be carried out by a user activating a pointing device with respect to the sub-component to be ordered. A particular method of selecting a sub-component to be ordered may be pre-selectable by the user.

In accordance with another aspect of the present invention, the method further includes the step of displaying an order summary list on the client system. The order summary list shows sub-components that have been selected to be ordered.

In accordance with a further aspect of the present invention, the method further includes the step of displaying a materials list on the client system. The materials list lists the sub-components of a product in an exploded view together with various information concerning each of the listed sub-components. The information to be listed may include any one or more of (a) a key number of the sub-component; (b) an identification number of the sub-component; (c) a replacement/substitute identification number of the sub-component; (d) a description of the sub-component; (e) specifications/materials of the sub-component; (f) a manufacturer/supplier of the sub-component; (g) a manufacturer identification number of the sub-component; (h) a stock-keeping-unit (SKU) number of the sub-component; (l) the quantity of the sub-component(s) used in the product; j) other sub-components associated with the sub-component as part of a kit; (k) the price of the sub-component; (l) the price of the product as a whole; (m) the availability of the sub-component; and (n) available varieties of the sub-component.

In accordance with yet another aspect of the present invention, the step of processing the selection of a sub-component to be ordered may include submitting the order to an order entry/fulfillment system, or automatically sending the order via a network to a supplier/manufacturer.

The present invention also provides a system for ordering a sub-component of a product. The system includes generally three components; means for displaying a diagram depicting sub-components of a product in an exploded view on a system screen; means for receiving a user selection of a sub-component to be ordered; and means for processing the selection of a sub-component to be ordered. The system may be a stand-alone system which, for example, can be located on the parts counter at a parts retail store.

Accordingly, the present invention takes advantage of computer technology to provide a single tool that enables a person to view parts (sub-components) in an exploded view diagram, selectively view the prices and other pertinent information (e.g., photos) about the parts in the diagram, and select parts from the diagram to be ordered. Therefore, a person only needs to utilize the interactive exploded view diagram ordering tool of the present invention when identifying parts and placing an order for the parts. It is ideally suited for, but not limited to, E-commerce Internet applications selling products and parts for those products, especially when the products comprise equipment that is made of multiple parts, many of which are purchased as replacement parts for that equipment. It can also be used for facilitating parts location and identification work performed by parts counter personnel waiting on customers.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4H are sample screen shots of an exploded view ordering tool Web page according to one embodiment of the present invention.

DETAILED DESCRIPTION OF THE PREFERRED EMBODIMENT

As described above, aspects of the present invention are embodied in a communication network, such as the Internet, more specifically in a Web site accessible via the Internet. As is well known to those skilled in the art, the term "Internet" refers to the collection of networks and routers that use the Transmission Control Protocol/Internet Protocol (TCP/IP) or the Uniform Datagram Packet/Internet Protocol (UDP/IP) to communicate with one another. Each of the networks in the Internet in turn includes a number of computers or servers and related devices. Communication links within and amongst the networks can be of a permanent nature, such as via cables, or can be of a temporary nature, such as connections made through telephone or radio links.

As the Internet has grown, so has the World Wide Web (WWW or "the Web"). The Web is a vast collection of interconnected documents written in HyperText Markup Language (HTML) or other markup languages, which are electronically stored at "Web sites" throughout the Internet. A Web site is a server connected to the Internet that has mass storage facilities for storing hypertext documents and that runs software for handling requests for those stored hypertext documents. A hypertext document normally includes a number of hyperlinks, i.e., highlighted portions of text that link the document to another hypertext document possibly stored at a Web site elsewhere on the Internet. Each hyperlink is associated with a Uniform Resource Locator (URL) that provides the exact location of the linked document on a server connected to the Internet and describes the linked document. As is well known to those skilled in the art, a Web site may store not only static information, but also provide dynamic content that changes depending on interaction between a user (or the Web browser executing on the user's computer) and the Web site. To this end, a Web server may include facilities for executing scripts and other application programs on the Web server itself.

A user is allowed to retrieve hypertext documents from the Web via a Web browser. A Web browser, such as MICROSOFT INTERNET EXPLORER® or NETSCAPE NAVIGATOR®, is a software program implemented by a Web client, i.e., the user's computer, to provide a graphical user interface (GUI) to the Web. Upon request by the user via the Web browser, the Web client accesses and retrieves the desired hypertext document from the appropriate Web server using the URL for the document and a protocol known as HyperText Transfer Protocol (HTTP). HTTP is a higher-level protocol than TCP/IP and is designed specifically for the requirements of the Web. It is used on top of TCP/IP to transfer hypertext documents between servers and clients.

Figure 1:
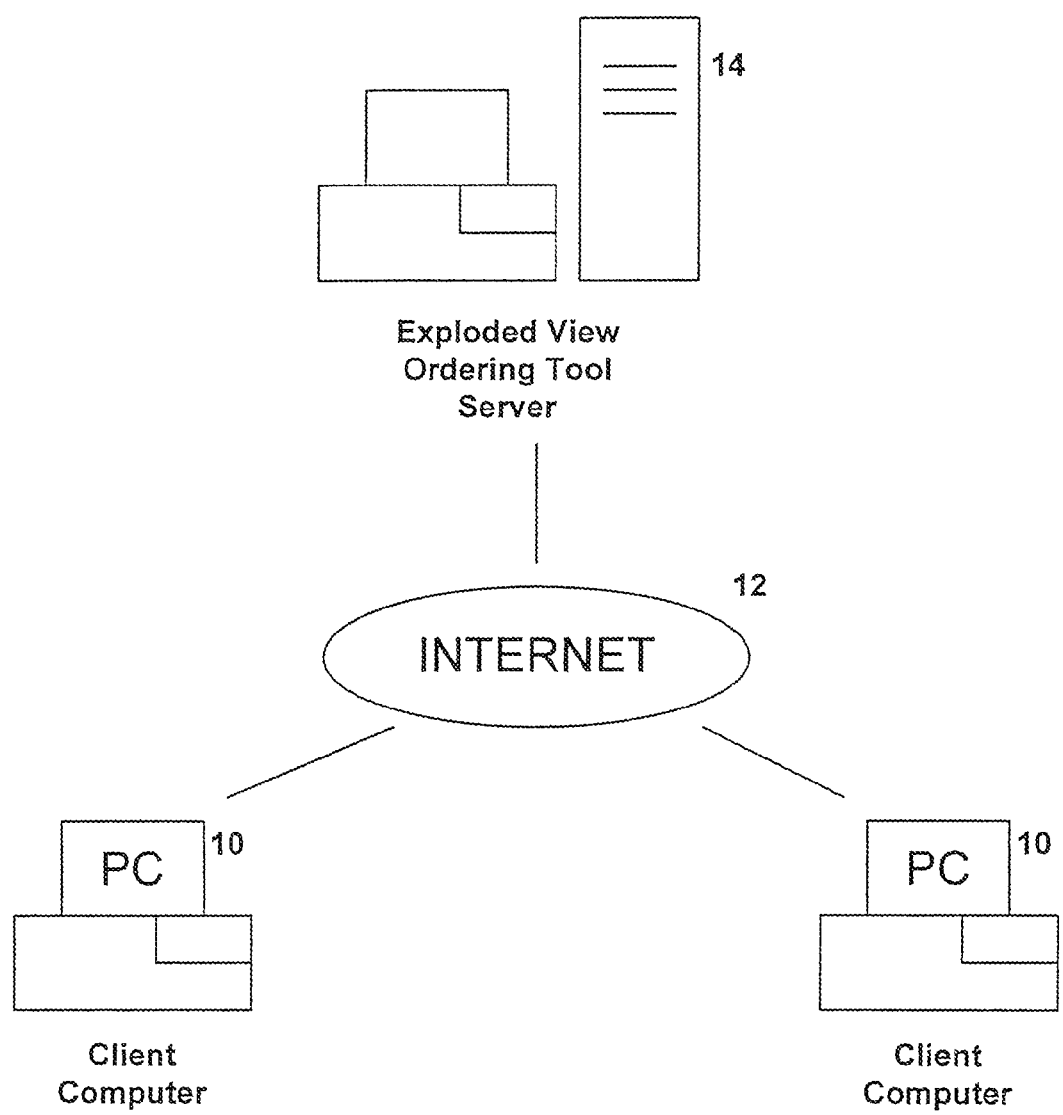
FIG. 1 is a block diagram depicting an illustrative operating environment for implementing a method according to one embodiment of the present invention.

Referring now to FIG. 1, an illustrative operating environment for implementing a method of the present invention will be described. Each client computer 10 connects to the Internet 12 through a modem or other type of connection known in the art. Once connected to the Internet, the client computer 10 may utilize its Web browser to view and interact with web sites such as a Web site provided by an exploded view ordering tool server 14 of the present invention. The client computer 10, as illustrated, may be a general-purpose personal computer capable of executing a Web browser. Alternatively, the client computer 10 may be another type of computing device, such as a portable computer, palm-top computer, cellular telephone, pager, personal digital assistance, and the like.

Figure 2A:
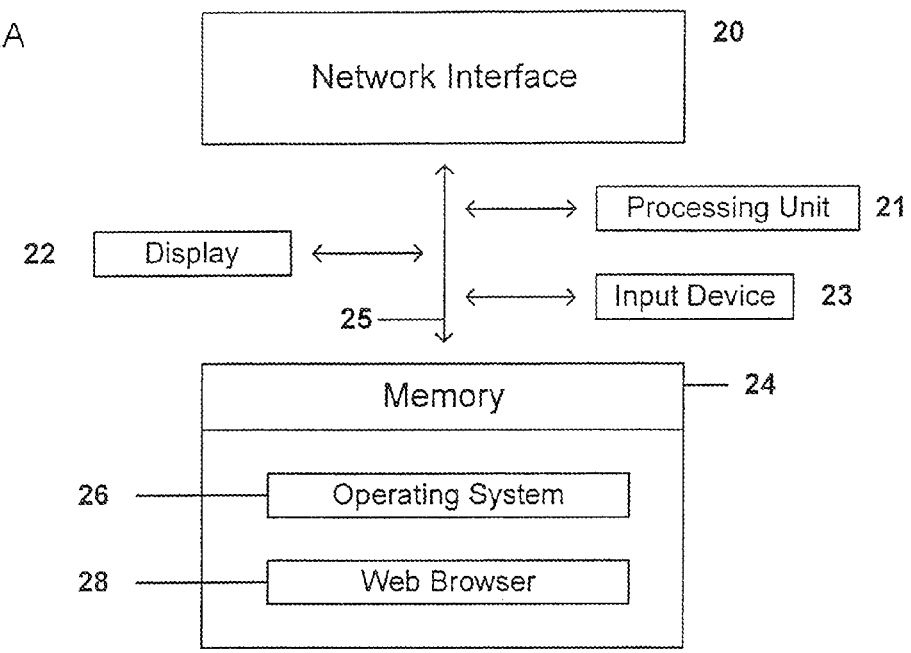
FIG. 2A is a block diagram depicting an illustrative architecture of a client computer of FIG. 1.

FIG. 2A depicts several key components of an exemplary client computer 10 of FIG. 1. Those of ordinary skill in the art will appreciate that the client computer 10 may include many more components than those shown in FIG. 2A. However, it is not necessary that all of these generally conventional components be shown in order to disclose an illustrative embodiment for practicing a method of the present invention. As shown in FIG. 2A, the client computer 10 includes a network interface 20 for connecting to the Internet 12. Those of ordinary skill in the art will appreciate that the network interface 20 includes the necessary circuitry for such a connection, and is also constructed for use with the TCP/IP protocol. The client computer 10 also includes a processing unit 21, a display 22, an input device 23, and a memory 24, all interconnected along with the network interface 20 via a bus 25. The memory 24 generally includes a random-access memory (RAM), a read-only memory (ROM), and a permanent mass storage device, such as a disk drive. The memory 24 stores an operating system 26 for controlling the operation of the client computer 10. The memory 24 also includes a Web browser 28 for accessing the Web, such as MICROSOFT INTERNET EXPLORER®, NETSCAPE NAVIGATOR®, or PHONE.COM UP.BROWSER®. The Web browser 28 is used to access the exploded view ordering tool Web site of the present invention, as will be more fully described below.

Figure 2B:
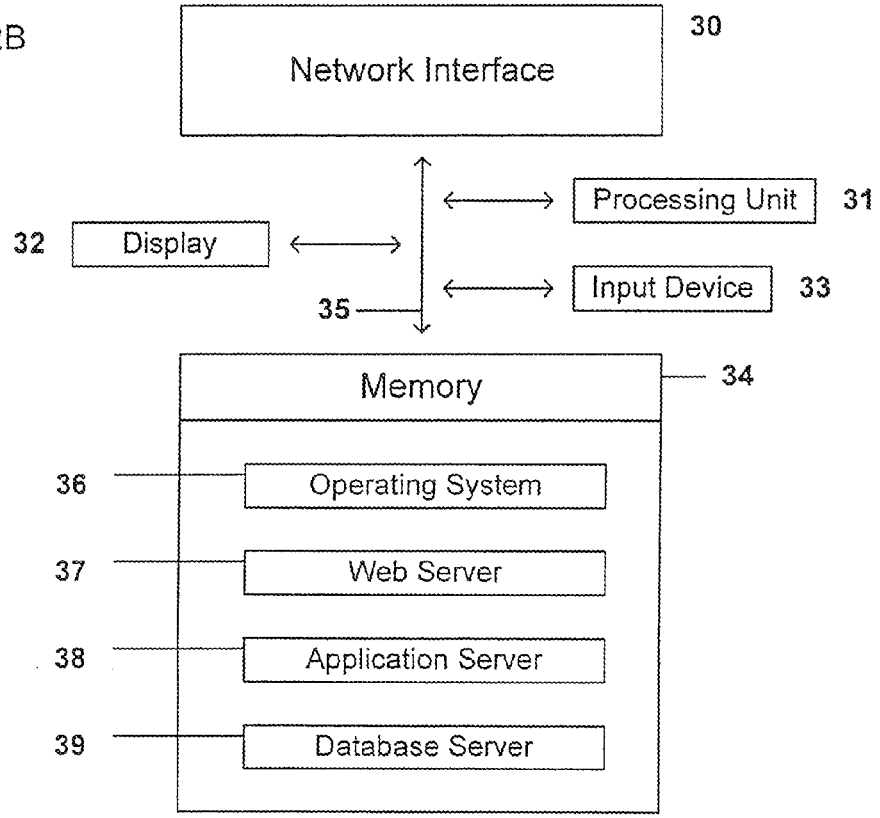
FIG. 2B is a block diagram depicting an illustrative architecture of a server of FIG. 1.

FIG. 2B depicts several of the key components of the exploded view ordering tool server 14 of FIG. 1. As before, those of ordinary skill in the art will appreciate that the server 14 includes many more components than those shown in FIG. 2B, but it is not necessary to show all of these generally conventional components in order to disclose an illustrative embodiment for practicing a method of the present invention. As shown in FIG. 2B, the server 14 is connected to the Internet 12 via a network interface 30. The server 14 also includes a processing unit 31, a display 32, an input device 33, and a mass memory 34, all interconnected along with the network interface 30 via a bus 35. The mass memory 34 generally consists of a RAM, a ROM, and a permanent mass storage device, such as a hard disk drive, tape drive, optical drive, floppy disk drive, or combination thereof. The mass memory 34 stores an operating system 36 for controlling the operation of the server 14. It will be appreciated that the operating system 36 may be a general-purpose server operating system as is known to those skilled in the art, such as UNIX®, LINUX®, or MICROSOFT WINDOWS NT®. The mass memory 34 also includes three sub-servers: a web server 37, an application server 38, and a database server 39. It should be appreciated by those skilled in the art that these sub-servers may be coupled together in various ways, perhaps via a network, and need not reside in a single physical location. The web server 37 supports the exploded view ordering tool Web page of the present invention. The application server 38 includes and controls the computer-executable program for carrying out a method of the present invention, i.e., displaying a diagram depicting sub-components of a product in an exploded view on a client system; receiving a user selection of a sub-component to be ordered via the Web browser executing on the client system; and processing the selection of a sub-component to be ordered. The database server 39 stores and manages data, such as information concerning the sub-components of various products, for use by the application server 38. This type of server configuration and computer communication is well known to those of ordinary skill in the art.

A method of the present invention is well suited for a Web application, which consists of server side programs in the server 14 that interact with the web browser 28 or client program (client) running on a client computer 10. The client program may be initially downloaded from the server 14 as part of the Web page from the server 14. The client program can be developed using several different programming languages, including client side scripting languages like JAVASCRIPT™ or VBSCRIPT, or it can be written using JAVA™ applets, ACTIVE® controls, or similar programs. The server side programs are typically running on a Web server 37 or application server 38 and can be integrated into an E-commerce application. Essentially, the server side programs send exploded view diagrams (and various information concerning sub-components) to the client program, and receive the sub-component ordering information from the client program. To present the information on the client computer 16, HTML can be used in conjunction with the client side scripting languages when the information is displayed as a Web page. If the client program is written using JAVA™ applets or ACTIVE® controls, language specific constructs are used to display the information and provide the interactivity like zooming, selecting parts, etc. Also, HTML and JAVASCRIPT™ may be used to specify what functionality is to be given to the client computer 10, as will be more fully described below. The exploded view diagrams are stored in a common Web image format such as GIF or JPEG.

Figure 3:
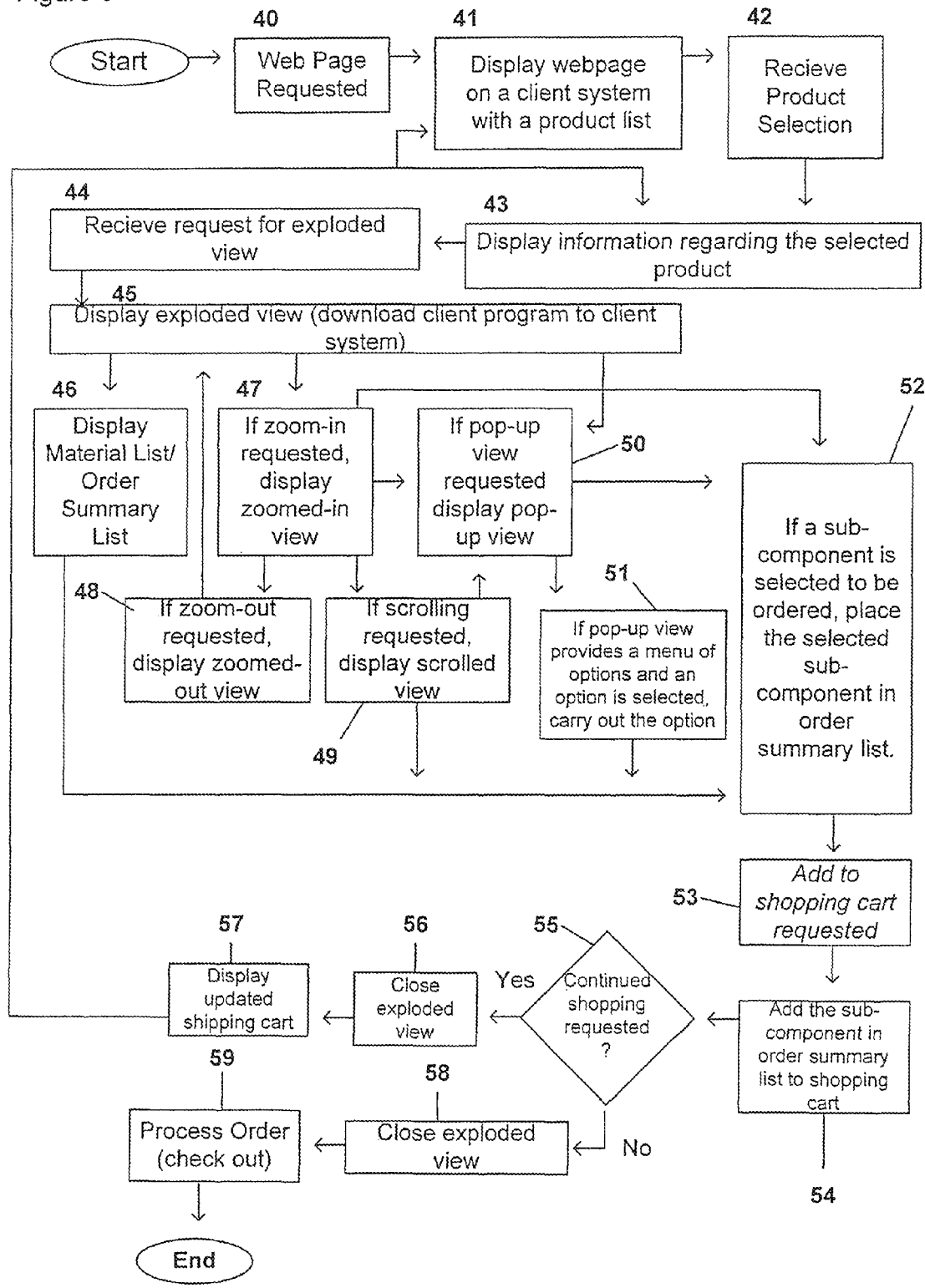
FIG. 3 is a flowchart illustrating the steps performed in a method according to one embodiment of the present invention.
Figure 4A:
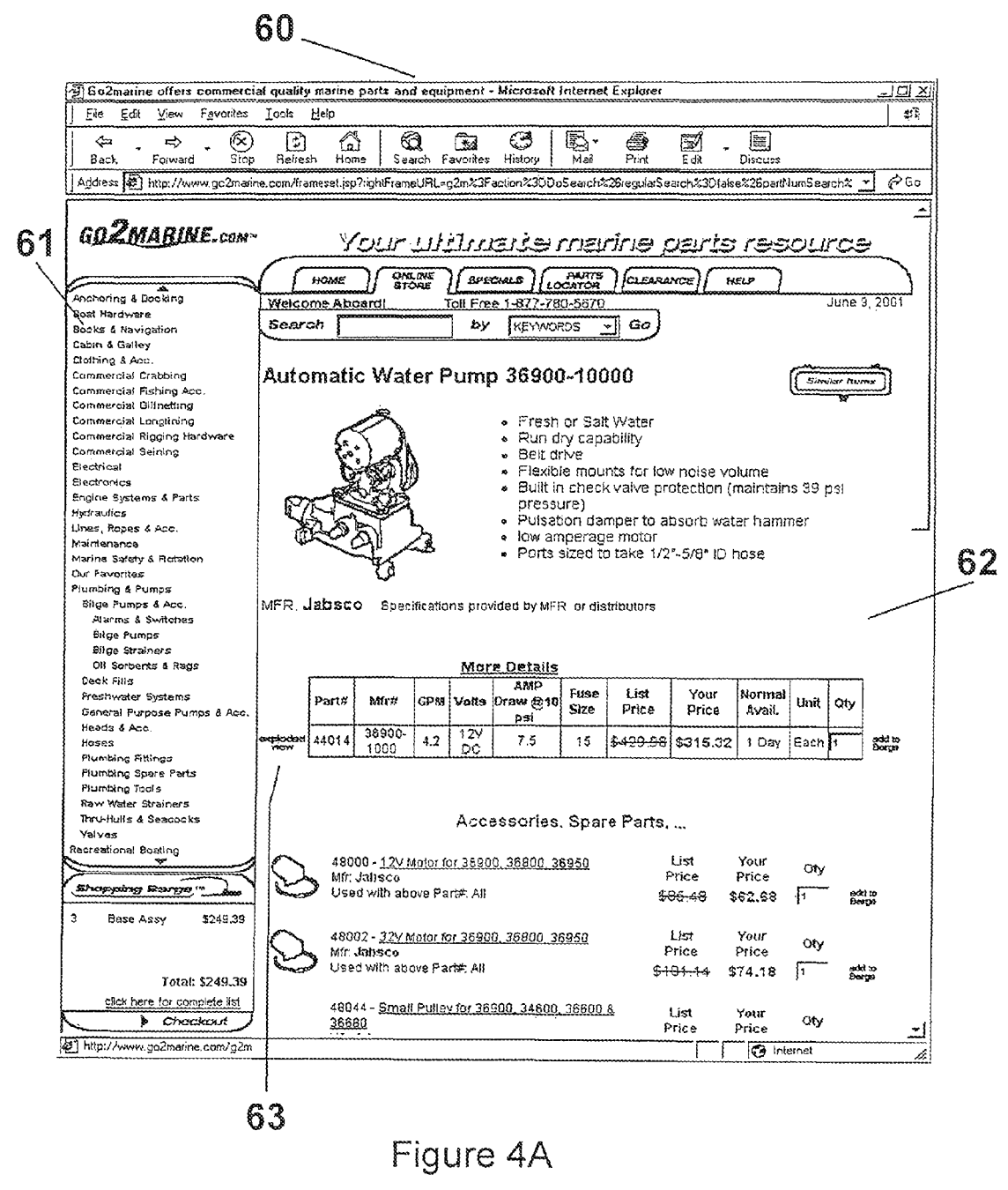

FIG. 3 illustrates exemplary steps to be taken in a method of the present invention as applied on the Internet for placing an order for a sub-component of a product. In the present description, the term "sub-components" of a product is used to describe not only the parts and other items that jointly form a complete product, but also any accessories or components that are typically associated or affiliated with a single product. At block 40, the server 14 receives a request from the client computer 10 for the exploded view ordering tool Web page. This request may be made using any method, e.g., by a user directly entering the URL of the Web page on the client computer 10 or activating a hyperlink (or shortcut) on the client computer 10 to the Web page. At block 41, in response to the request, the server 14 transmits the Web page to the client computer 10. A sample Web page 60 is shown in FIG. 4A. As illustrated, the Web page 60 lists a number of selectable product categories 61. Each category in turn lists a number of products thereunder, via a pull-down menu, for example.

Figure 4B:
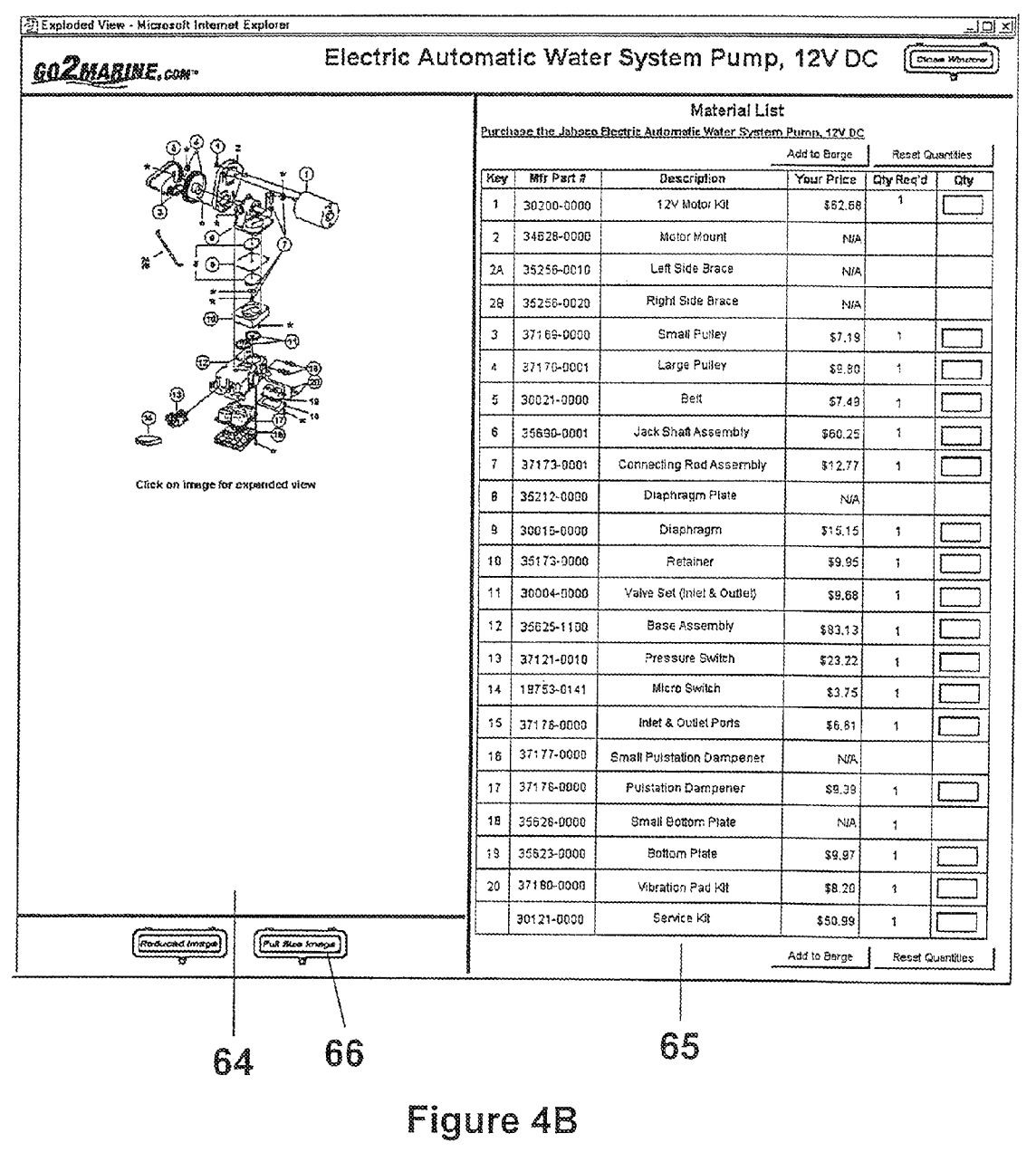

In FIG. 3, at block 42, the user's product selection is received. For example, the user may select a particular product in the Web page 60 by clicking a computer mouse on the product. Other methods of selecting an item in a Web page will be also apparent to those skilled in the art. At block 43, the information regarding the selected product is displayed on the client computer 10. Again referring to FIG. 4A, various information concerning the selected product ("Automatic Water Pump 36900-10000" in the illustrated example) is displayed in a screen frame 62. The screen frame 62 also displays an "exploded view" icon 63 prompting the user to view an exploded view of the selected product. In FIG. 3, at block 44, if a request for an exploded view is received (e.g., by the user clicking a computer mouse on the "exploded view" icon 63), at block 45, the requested exploded view of the product is displayed on the client computer 10, as shown in FIG. 4B, screen frame 64. At block 45, a client program may also be downloaded from the server 14 to the client computer 10, as discussed above. It should be understood by those skilled in the art that the means for displaying an exploded view in accordance with the present invention is not limited to a conventional two-dimensional display, as shown in FIG. 4B. Rather, the present invention may be practiced using any other types of display systems suitable for displaying an exploded view, which are now and may in the future be available, including three-dimensional displays, virtual reality display systems, and animated assembly and disassembly systems.

Figure 4C:
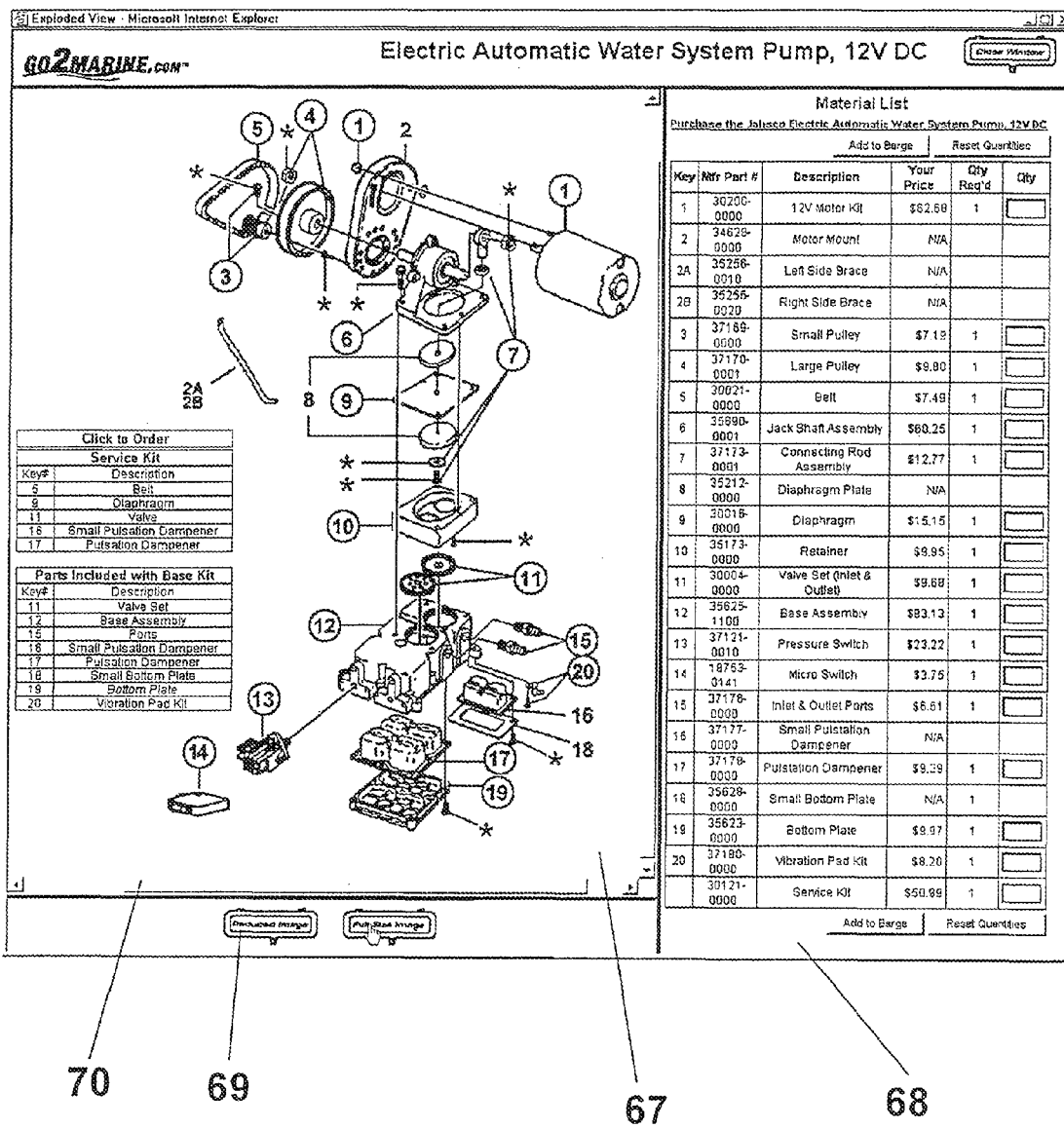

In FIG. 3, at block 46, as the exploded view of the product is displayed, the Web page may also display a materials list/order summary list 65 in a table format (labeled as "Materials List" in FIG. 4B.) The materials list lists the sub-components of a product in the exploded view 64, together with information concerning each of the listed sub-components to help the user identify the characteristics of each sub-component. For example, the materials list may list any one or more pieces of information as follows: (a) a key number of the sub-component (i.e., circled numbers 1 through 20 in the exploded view 64 of FIG. 4B), which is used to help locate the sub-component in the exploded view; (b) an identification number of the sub-component (i.e., a part number); (c) a replacement/substitute identification number of the sub-component (i.e., a replacement/substitute part number); (d) a description of the sub-component (e.g., a part name); (e) specifications/materials of the sub-component (e.g., brass, steel, aluminum, etc.); (f) a manufacturer/supplier of the sub-component; (g) a manufacturer identification number of the sub-component (i.e., a manufacturer part number); (h) a stock-keeping-unit (SKU) number of the sub-component, which uniquely identifies the sub-component in a catalog ordering application; (i) the quantity of the sub-component(s) used (or required) in the product; (j) other sub-components associated with the sub-component as part of a kit (see, for example, the "Service Kit" and "Parts Included with Base Kit" lists shown in FIG. 4C, screen frame 70); (k) the price of the sub-component; (l) the price of the product as a whole; (m) the availability of the sub-component; and (n) available varieties of the sub-component (e.g., the same sub-components but made of different materials). The sample materials list 65 in FIG. 4B lists: a key number, identification number (part number), description (part name), and price of each sub-component, together with the number of sub-components used (or required) in the product ("Qty Req'd"). The materials list may be part of the exploded view, adjacent to it, or on an auxiliary screen view (as shown in FIG. 4B). Displaying the materials list and the exploded view at the same time significantly aids the user when attempting to identify and/or order a sub-component (part) for a product.

The materials list shown in FIG. 4B is in fact a combination of a materials list and an order summary list (materials list/order summary list), in that the list 65 also includes a column showing the number of sub-component(s) that have been selected to be ordered under the heading "Qty" (i.e., an order summary list). In the example of FIG. 4B, no sub-component has been selected to be ordered yet, so every box in the "Qty" column is empty. In the illustrated example, the order summary list includes order quantity ("Qty") boxes only for those sub-components that can be ordered (or requested for quotation). In one embodiment, when a sub-component that cannot be ordered (e.g., out of stock) is selected, a message is displayed advising the user to call a supplier/manufacturer.

As will be apparent to those skilled in the art, there are many ways of presenting various information in accordance with the present invention. For example, the exploded view diagram and materials list/order summary list can be displayed in a single window, in two separate frames in a single window, or in two separate pop-up windows. Because the exploded view diagram and materials list/order summary list can be quite large, it has been found that displaying the information in two separate frames in a single window (as shown in FIG. 4B) is an effective way to meaningfully display the information, since most browsers will display scroll bars for selective viewing.

Although in the illustrated embodiment, the materials list/order summary list is described as including information concerning all the sub-components included in the exploded view diagram, in another embodiment, a materials list/order summary list may be created to list the information pertinent to only those sub-component(s) that are selected by the user from the exploded view. This option may be preferable when, for example, multiple variations exist for the same sub-component (e.g., the same part is available in different materials), and displaying the materials list/order summary list for each variation may take up too much space.

Figure 4D:
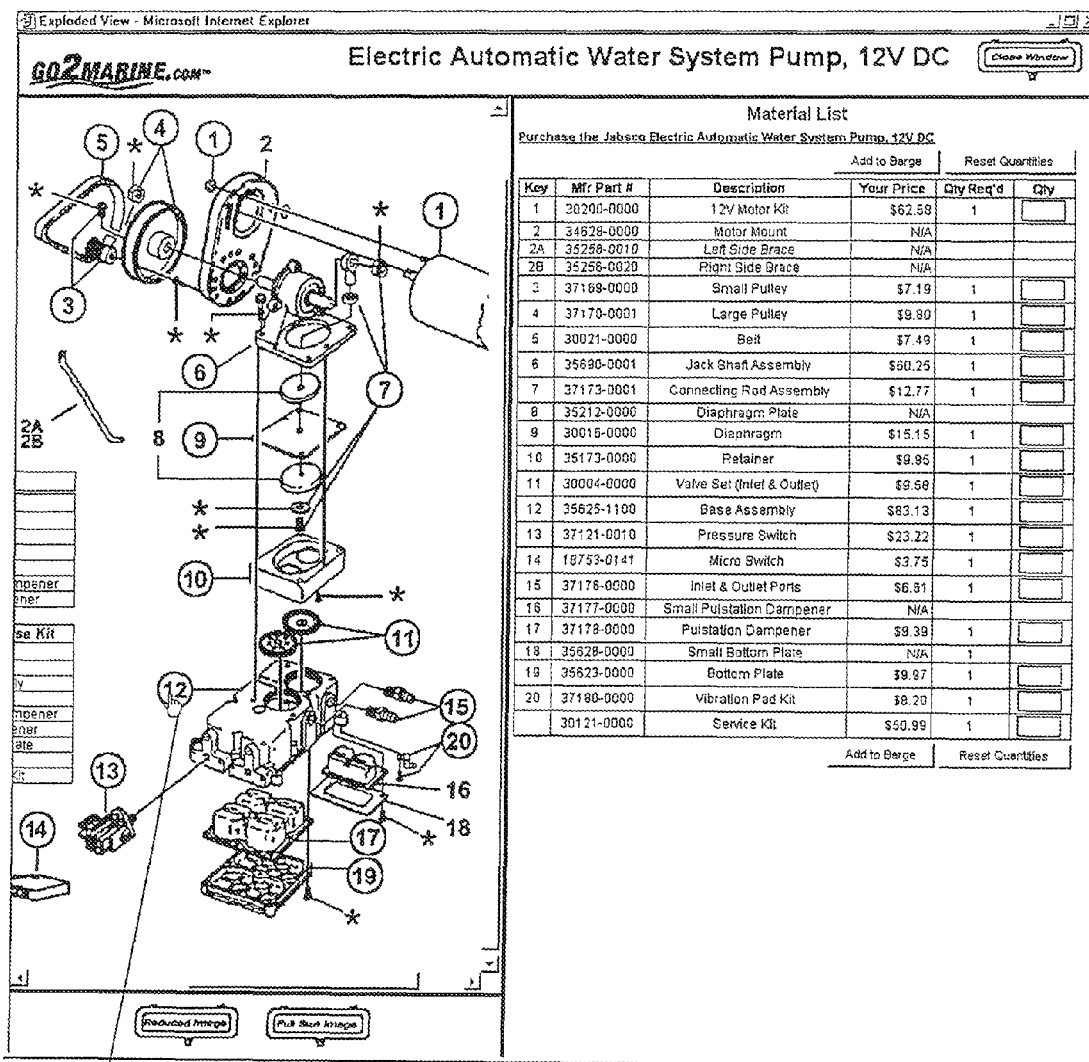

In FIG. 3, at block 47, if the user requests to zoom in on the exploded view to better view the details of individual sub-components by, for example, clicking the "Full Size Image" button 66 in FIG. 4B, a zoomed-in view of the exploded view is displayed, as shown in FIG. 4C, screen frame 67. At this time, an adjacent frame 68 including the material list/order summary list is correspondingly reduced. In FIG. 3, at block 48, the user may request to zoom out of the zoomed-in view to return to the original exploded view by, for example, clicking the "Reduced Image" button 69 in FIG. 4C. When a zoomed-in view is requested, only a portion of the exploded view diagram may be displayed. In such a case, referring to FIG. 3, block 49, the user may request to scroll the zoomed-in view by, for example, using a scroll bar 70 in FIG. 4C. FIG. 4D shows the zoomed-in exploded view scrolled to the right.

To accomplish the functionality of displaying an entire exploded view diagram and then being able to display a zoomed-in view to show closer details of individual sub-components requires some means to change the display size or resolution of the diagram image. There are many techniques to display multiple sizes or resolutions of an image on the Web. One simple technique is to use multiple images. One image can be sized so that the entire diagram can be displayed in the viewer frame. A second image can be sized so that the sub-components included therein are larger and it is easier to view the distinguishing characteristics of the sub-components and to select the correct sub-components from the diagram. To achieve multiple levels of zoom, multiple images can be used. Another technique is to use a single image. In this case, one approach to achieve zooming in and out is to dynamically change the height and width dimensions of the image in HTML or equivalent programming language. When the "zoom in" control is selected, the dimensions of the image are set to large values to display a larger image of each sub-component. Selecting the "zoom out" control sets the dimensions to low values so the entire diagram is displayed within the frame. Many levels of zoom can be achieved by choosing different height and width dimensions.

The zoom controls need to be easily identifiable to the user as a means to change the resolution of the diagram. These controls can be HTML form buttons, clickable image links, or HTML text links. If multiple images are used to achieve zooming in/out, the clicking on a zoom control would load different Web pages that contain the appropriately sized images, or when calling a server program, pass a parameter that tells the server program to display the appropriately sized image. If a single image approach is used, selecting the zoom control would call a JAVASCRIPT™ or similar programming language function to change the image size.

When an image that is larger than the frame is displayed, most Web browsers automatically display the scroll bars in the frame to enable the user to scroll around the diagram, as explained above. Also, to aid in navigating extremely large diagrams, a panning control can be used. This function would show the user where they are in the overall diagram when they are navigating around while in the zoomed-in mode. This functionality is supported by any industry standard panning software. In one variation of the invention, the panning control includes a small separate window that displays the entire diagram. Superimposed on the diagram is a box that shows the region of the diagram that is currently displayed in the viewer frame. As the user scrolls around the diagram, this box can move to show the currently displayed region. The user can also click and slide the box around using a computer mouse, for example. This allows the diagram to be scrolled in the viewer frame. As the user zooms in and out, the box shrinks or grows to show the currently viewed region of the diagram.

In FIG. 3, at block 50, the user may request to receive a "pop-up" view concerning a particular sub-component included in the exploded view to obtain further information about the sub-component. The user may select a particular sub-component, for which additional information is requested, from any one of the original exploded view (block 45 in FIG. 3), zoomed-in view (block 47), and scrolled view (block 49), using any pointing device known in the art. For example, the pointing device may be a computer mouse that can be clicked (right-click, left-click, single-click, double-click, etc.) on or simply placed over the sub-component (or a key number of the sub-component) to be selected; a stylus that can be pointed to the sub-component (or a key number of the sub-component) to be selected, or even a finger or any digital object that can be used to touch the sub-component (or a key number of the sub-component) to be selected on a touch-screen system. As a further example, a pointing device may be a conventional keyboard, wherein the user can sequentially "tab" through the sub-components listed in the materials list/order summary list using, for example, an arrow key and select a particular sub-component by, for example, striking the "enter" key one or more times. As still further examples, the selection of a sub-component may be achieved using various other pointing devices that are now and may in the future be available, such as virtual reality gloves and eye movement tracking systems. Thus, one skilled in the art should understand that the selection of a sub-component using a pointing device, according to the present application, may be carried out by using various screen or monitor positioning and location identifying techniques.

A pop-up view can either be a momentary window that appears, for example, while touching or "mousing over" the sub-component (i.e., positioning the cursor over the sub-component without clicking), or a regular window or a different screen (or frame) window, any of which would result from the act of selecting the sub-component. The pop-up view displays information concerning the selected sub-component, which can be used to aid the user in better identifying the characteristics of the sub-component and making a decision whether to order the sub-component. The information to be included in a pop-up view may include one or more of the following: (a) a picture or photograph of the sub-component; (b) a key number of the sub-component; (c) an identification number of the sub-component; (d) a replacement/substitute identification number of the sub-component; (e) a description of the sub-component; (f) specifications/materials of the sub-component; (g) a manufacturer/supplier of the sub-component; (h) a manufacturer identification number of the sub-component; (i) a stock-keeping-unit (SKU) number of the sub-component; (j) the quantity of the sub-component(s) used in the product; (k) other sub-components associated with the selected sub-component as part of a kit; (l) the price of the sub-component; (m) the price of the product as a whole; (n) the availability of the sub-component; (o) available varieties of the sub-component; (p) an order icon for ordering the sub-component; and (q) a menu listing one or more pieces of information selected from the group consisting of information items (a)-(p) above.

Figure 4E:
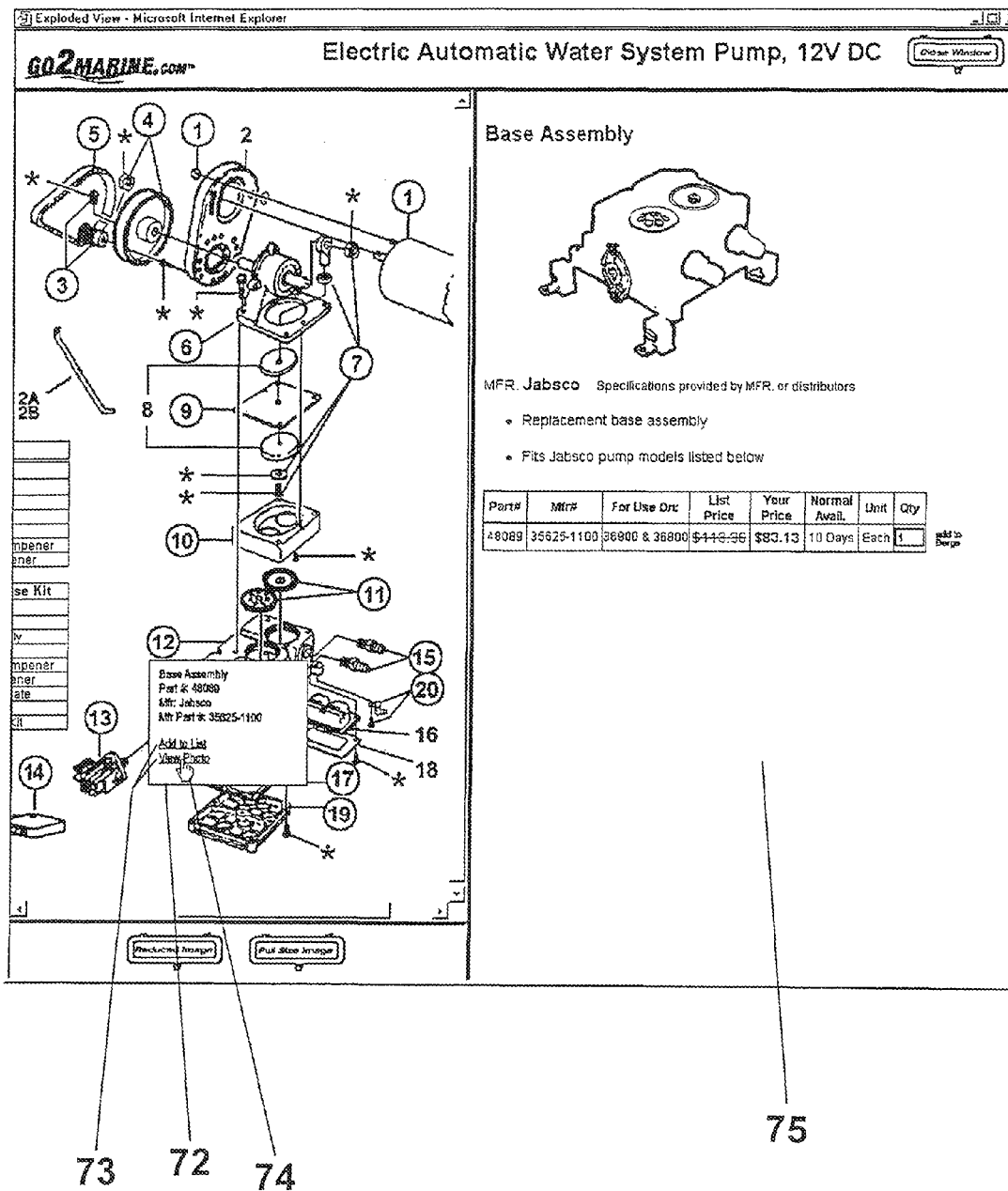

For example, referring to FIG. 4D, when a user selects sub-component "12" ("Base Assembly") by placing a computer mouse over the key number "12" of the sub-component in the exploded view, as noted by reference number 71, referring to FIG. 4E, a pop-up window 72 is displayed, listing the description (name), identification number (part number), manufacturer, and manufacturer identification number (manufacturer part number) of the sub-component. The pop-up window 72 further includes a menu 73 including an order icon for ordering the sub-component ("Add to List") and an option to view a photograph of the sub-component ("View Photo"). Referring to FIG. 3, block 51, when the user selects an option in the menu 73, the selected option is displayed or is carried out. For example, when the user clicks or places a computer mouse on the "View Photo," as indicated by reference number 74, a photograph of the selected sub-component (i.e., "Base Assembly" in the illustrated example), is displayed in a screen frame 75 for the user's view.

Figure 4F:
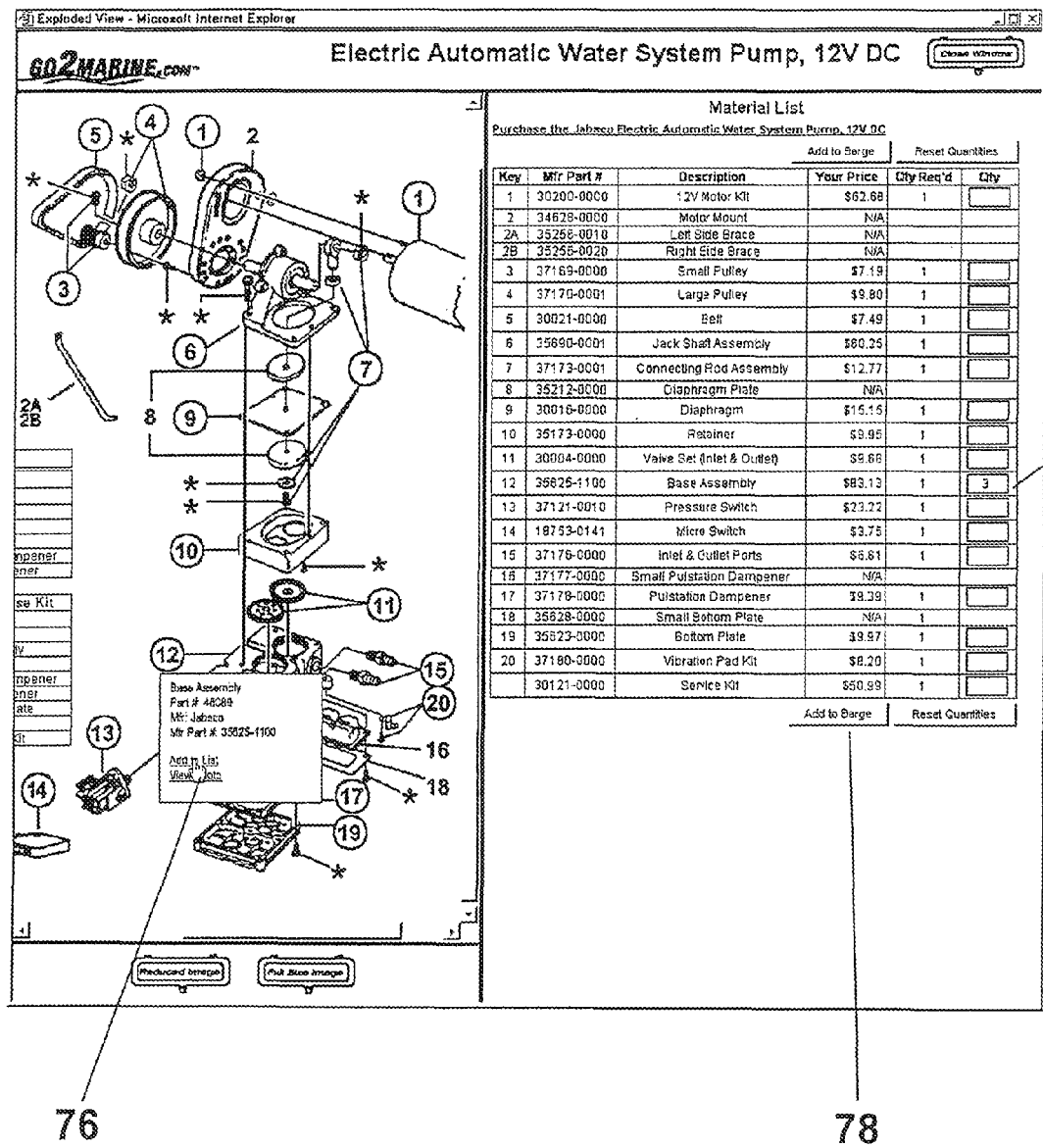

Alternatively or additionally, referring to FIG. 4F, when the user clicks or places a computer mouse on the "Add to List" icon 76 in the menu, the sub-component ("Base Assembly") is selected to be ordered and thus is included in the order summary list, as indicated by reference number 77 in FIG. 4F. This step corresponds to FIG. 3, block 52. In FIG. 4F, the quantity box in the order summary list indicates that three units of the "Base Assembly" have been selected to be ordered. In one embodiment, selecting the "Add to List" icon 76 (e.g., by clicking on the icon) repeatedly will increment the order quantity for the selected sub-component in the order summary list. For example, clicking a mouse on the "Add to List" icon 76 once will select one "Base Assembly" to be ordered, clicking a mouse on the "Add to List" icon 76 twice will select two "Base Assemblies" to be ordered, and so forth. Alternatively, the user may simply enter the number of sub-components to be ordered in the order summary list using a keyboard. This is shown in FIG. 3, wherein an arrow extends from block 46, which displays an order summary list, to block 52, which adds a sub-component to be ordered in the order summary list.

One technique for allowing a user to select a sub-component to be ordered directly in an order summary list is to list the order summary list (or a combined materials list/order summary list) as an HTML form, and display a text field for each part in the form to enter and/or edit order quantities. To select the desired sub-components and specify the order quantity, the user enters the order quantity in the text fields.

Further alternatively, the user selection of a sub-component to be ordered may be carried out by the user clicking a computer mouse on the sub-component itself (or a key number of the sub-component) to be ordered, touching the sub-component (or a key number of the sub-component) to be ordered on a touch-screen system, or otherwise selecting the sub-component to be ordered using any pointing device employing various screen or monitor positioning and location identifying techniques, as described above. Note that in FIG. 3, arrows extend also from blocks 45 (original exploded view), 47 (zoomed-in exploded view), 49 (scrolled exploded view), and 50 (a pop-up view) all to block 52 (selection of a sub-component to be ordered), illustrating that the selection of a sub-component to be ordered may be carried out from any of these various views.

To select sub-components from the exploded view diagram, some means is necessary to identify the sub-components in the diagram with respect to the position of the pointing device used (e.g., cursor, finger touch, etc.). To achieve this, an HTML image map or equivalent is used with the diagram. To associate each sub-component, or the key number for each sub-component, with the materials list/order summary list, a commercially available mapping tool can be used, such as CUTEMAP™ by GLOBALSCAPE, Inc. The URLs defined in the image map uniquely identify the sub-components, to which the image map entries are mapped. Typically, the URLs include the part numbers for each sub-component. When a mapped sub-component is selected, the browser loads the associated URL in the image map. Loading a URL can either execute a JAVASCRIPT™ function or call a server program to perform the desired function of incrementally adding an order quantity to the order quantity box in the materials list/order summary list (or displaying the additional information about the sub-component in a pop-up view, as described above).

In one embodiment, a particular method of the user selection of a sub-component to be ordered may be selectable by the user. One way to accomplish this is to provide the user the opportunity to change the functionality associated with a method of the present invention by selecting a different display mode. For example, two HTML radio buttons can be used for activating the functionality for (1) selecting a sub-component to be ordered by clicking an order icon (e.g., "Add to List" icon), or (2) selecting a sub-component to be ordered by clicking on the sub-component itself. As another example, two HTML radio buttons can be used for activating the functionality for (1) adding a sub-component to the order summary list (or even directly to a "shopping cart," as will be discussed later) upon selection of the sub-component, or (2) displaying information pertinent to a sub-component upon selection of the sub-component.

In another embodiment, two methods of sub-component selection are available to the user at the same time, so that the user can not only view additional information concerning a sub-component by selecting the sub-component using the first method but also select a sub-component to be ordered by selecting the sub-component using the second method. For example, in one embodiment, when the user right clicks on a sub-component, a pop-up view including various information concerning the sub-component is displayed, while when the user left clicks on a sub-component, the sub-component is selected to be ordered and placed in an order summary list. As another example, when the user single clicks on a sub-component, a pop-up view is displayed, while when the user double clicks on a sub-component, the sub-component is selected to be ordered. In other words, various arrangements are possible wherein the user's chosen method of selecting a sub-component determines whether a pop-up view of the sub-component is displayed or the sub-component is to be ordered (i.e., added to an order summary list).

In yet another embodiment, the user may request a pop-up view of a particular sub-component by selecting the sub-component (e.g., by placing a mouse over the sub-component), and then may request to add the same sub-component to an order summary list by selecting the sub-component for the second time (e.g., by clicking a mouse on the same sub-component). Another example of a similar approach is to display a pop-up view upon the first clicking of a mouse on a sub-component (or a key number of the sub-component), with an order ("Add To List") icon being included in the pop-up view by default, and to increment the order quantity in an order summary list upon the second clicking on the order icon.

Figure 4G:
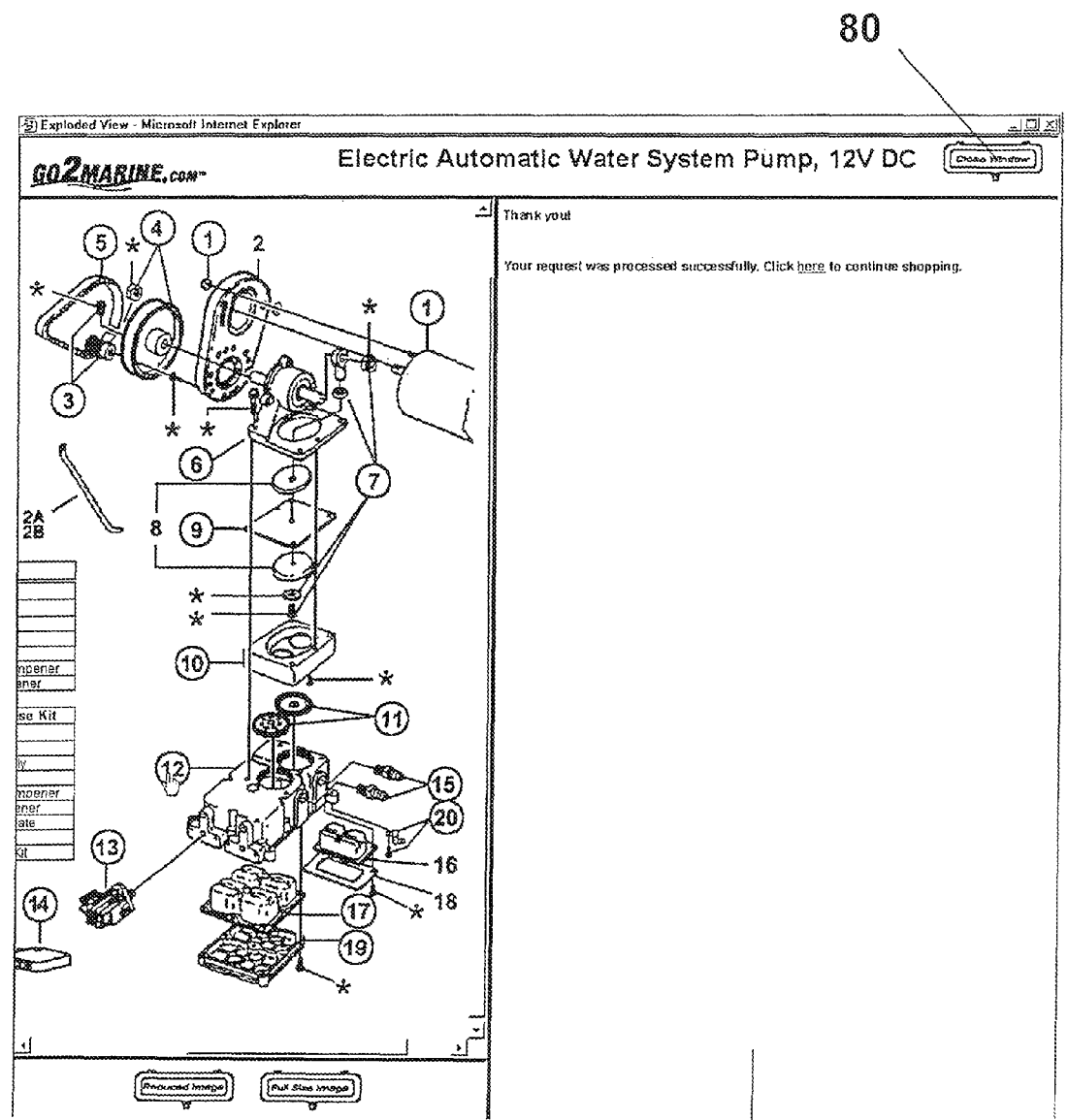
Figure 4H:
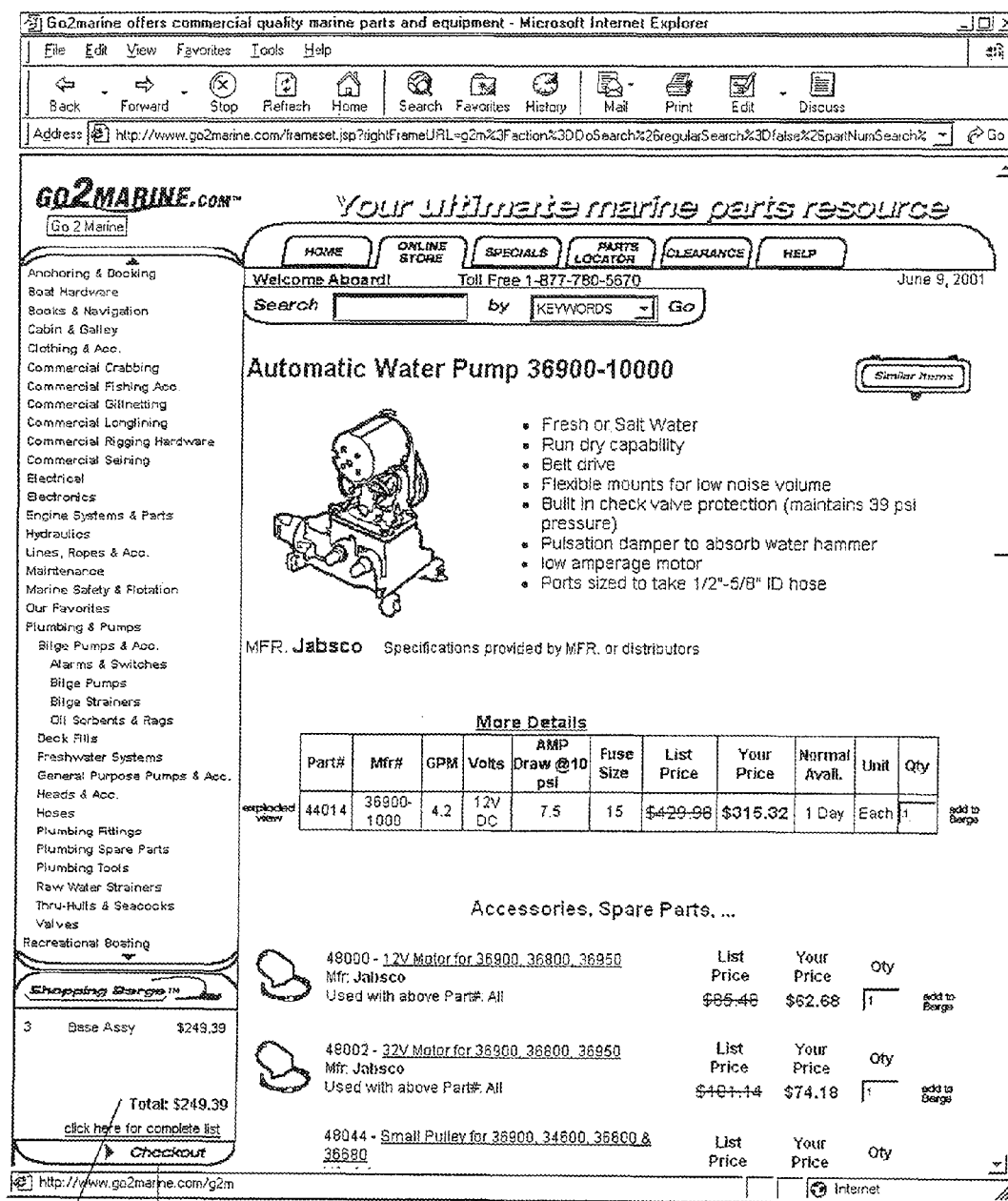

Referring back to FIG. 3, at block 53, the user may be prompted to add the sub-components listed in the order summary list to a so-called "shopping cart." In FIG. 4F, "Add to (Shopping) Barge" button 78 is displayed for this purpose. The function and operation of a "shopping cart" is well known in the E-commerce art and thus is not described in detail here. When the user so requests by, for example, clicking on the "Add to Barge" button 78, in FIG. 3, at block 54, all the sub-components listed in the order summary list, whose order quantity is more than zero, are added to a shopping cart. At this time, the Web page may look like FIG. 4G. In FIG. 4G, a screen frame 79 displays a notice to the user that the request was processed successfully (i.e., the selected sub-components have been added from the order summary list to the shopping cart). The screen frame 79 also displays a prompt asking the user whether he wishes to continue shopping. This step corresponds to FIG. 3, block 55. If the user wishes to continue shopping, at block 56, the exploded view may be closed. Then, at block 57, a shopping cart is updated and displayed (see FIG. 4H, "Shopping Barge" 81, listing the orders that have been added to the shopping cart together with the updated monetary total), and the method returns to either FIG. 3, block 41 to display the initial Web page listing various products, or to block 43 to display the information regarding the last selected product. The sample screen shot of FIG. 4H illustrates that the method has returned to block 43 to display the information regarding the product ("Automatic Water Pump 36900-10000") that was last selected.

In FIG. 3, at block 55, if the user indicates that he does not wish to continue shopping, at block 58, the exploded view may be closed. This may occur in response to the user selecting a "Close Window" button 80 in FIG. 4G. Thereafter, in FIG. 3, block 59, the order for the sub-component(s) placed in the shopping cart is processed (checked out). This may occur in response to the user selecting a "Checkout" button 82, as shown in FIG. 4H.

Various modifications are available to the method of processing the selection of a sub-component to be ordered, described above in reference to FIG. 3. For example, selecting a sub-component in the diagram may add the sub-component directly to the shopping cart, sales order, or purchase order. In this case, the user will not be prompted to add the selected sub-component(s) to be ordered to the shopping cart. Rather, a selectable link adds the identified sub-component(s) directly to the shopping cart, sales order, or purchase order. Thus, the processing of a selection of a sub-component to be ordered, as used in the present invention, is not limited to simply placing a sub-component that is selected to be ordered into a shopping cart upon a user's request, in the case of an E-commerce application.

In one embodiment, processing of the selection of sub-component(s) to be ordered may include submitting the order to any suitable back-office order entry/fulfillment system (e.g., a Material Requirement Planning (MRP) system), or automatically sending the order via a network (e.g., the Internet, including an extranet, wired or wireless) to a supplier/manufacturer.

Once the selection of a sub-component to be ordered is thus processed, any remaining steps typically involved in processing an order, such as packaging and shipping the ordered sub-component(s), are carried out.

According to another embodiment of the present invention, the user may print the exploded view and materials list/order summary list using a print button that uses JAVA™ or another equally suited program language to access the browser's print functions, or using a simpler method to associate the exploded view diagram and materials list/order summary list with one standard Web page so that the user's browser print button functions can be accessed for printing the information. The printout of the exploded view and materials list/order summary list can be used for disassembly and reassembly of the product for repair, maintenance, or troubleshooting.

The foregoing discusses a method of the present invention embodied in an Internet-based Web application. Alternatively, it can be readily seen that the same can be implemented in other network-based applications including extranet-based, local area network (LAN)-based, and wide area network (WAN)-based applications, or a client-server application, stand-alone application, or "point of sale" or inventory computer system using standard computer application development techniques. To take advantage of a networked system, though, a stand-alone application may be coupled to a suitable network for the purpose of submitting an order to an order entry/fulfillment system (e.g., a Material Requirement Planning (MRP) system), or automatically sending an order to a supplier/manufacturer via the network.

According to the present invention, whether a method is implemented as an Internet-based application or is embodied in a stand-alone system, for each family of sub-components (parts) that make up a product, the method allows a user to view the exploded view, associated materials list(s) and/or order summary list(s), and pertinent information or links to the information about the sub-components in the exploded view, which could assist the user when attempting to identify and/or order a sub-component for the product. It can be readily seen that the benefits of the present invention include, among other things, the ability to display sub-components for purchasing while the sub-components are associated with the other sub-components of the assembly for ease of identification, and to quickly provide relevant information about each sub-component or a family of sub-components that is selected. The benefits further include the ability to allow the user to directly add sub-components to an order summary list, purchasing summary list, or as in the case of E-commerce Web sales, to a "shopping cart," sales order, or purchase order without any other intervening steps.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A non-transitory computer-readable storage medium having computer-executable instructions stored thereon that, in response to execution by one or more processors of a computing device, cause the computing device to perform actions for placing an order for a sub-component of a product, the actions comprising:
    causing a list of a plurality of products to be displayed on a user system;
    receiving a user selection of one of the plurality of products from the list to be viewed in an exploded view on the user system;
    causing a diagram depicting sub-components of the selected product in an exploded view to be displayed on the user system, the exploded view showing an assembly drawing of the selected product in which the sub-components are spaced apart from each other in an unassembled state, such that individual characteristics of the sub-components are visible;
    causing a materials list to be displayed on the user system while displaying the exploded view, the materials list listing the sub-components of the selected product in the exploded view together with information concerning the listed sub-components;
    receiving, while the exploded view and the materials list is being displayed, a user selection from the user system of a sub-component depicted in the diagram to be ordered;
    causing to be displayed in the materials list an order quantity for the selected sub-component, based on the received user selection of the sub-component;
    determining whether the selected sub-component is available to be ordered;
    processing the selection of the sub-component to be ordered, in response to determining that the selected sub-component is available to be ordered; and
    informing the user to obtain the selected sub-component from another source, in response to determining that the selected sub-component is unavailable to be ordered.

2. The computer-readable storage medium of claim 1, wherein the actions further comprise selectively causing information concerning a sub-component in the diagram to be displayed on the user system in response to a user input identifying the sub-component.

3. The computer-readable storage medium of claim 2, wherein the information concerning a sub-component comprises one or more pieces of information selected from the group consisting of:
    (a) a picture or photograph of the sub-component;
    (b) a key number of the sub-component;
    (c) an identification number of the sub-component;
    (d) a replacement/substitute identification number of the sub-component;
    (e) a description of the sub-component;
    (f) specifications/materials of the sub-component;
    (g) a manufacturer/supplier of the sub-component;
    (h) a manufacturer identification number of the sub-component;
    (i) a stock-keeping-unit (SKU) number of the sub-component;
    (j) the quantity of the sub-component(s) used in the product;
    (k) other sub-components associated with the selected sub-component as part of a kit;
    (l) the price of the sub-component;
    (m) the price of the product as a whole;
    (n) the availability of the sub-component;
    (o) available varieties of the sub-component;
    (p) an order icon for ordering the sub-component; and
    (q) a menu listing one or more pieces of information selected from the group consisting of information items (a)-(p) above, wherein the actions further comprise selectively causing a piece of information from the menu to be displayed in response to a user input selecting one of information items (a) through (o), or processing the selection of a sub-component to be ordered in response to a user input selecting information item (p).

4. The computer-readable storage medium of claim 2, wherein the user input is carried out by a user activating a pointing device.

5. The computer-readable storage medium of claim 4, wherein activating a pointing device is selected from the group consisting of:
    clicking a mouse or placing a mouse on the sub-component in the diagram;
    clicking a mouse or placing a mouse over a key number of the sub-component in the diagram;

touching the sub-component or a key number of the sub-component in the diagram on a screen of the user system; and entering an identification of the sub-component using a keyboard.

6. The computer-readable storage medium of claim 1, wherein the user selection of a sub-component to be ordered is received when the user performs a step of activating a pointing device.

7. The computer-readable storage medium of claim 6, wherein activating a pointing device is selected from the group consisting of:
    clicking a mouse on or touching the sub-component in the diagram to be ordered;
    clicking a mouse on or touching a key number of the sub-component in the diagram to be ordered;
    clicking a mouse on or touching an order icon associated with the sub-component to be ordered; and
    entering the quantity of the sub-component to be ordered using a keyboard.

8. The computer-readable storage medium of claim 7, wherein a particular technique of the user selection of a sub-component to be ordered is selectable by the user.

9. The computer-readable storage medium of claim 1, wherein the user selection of a sub-component to be ordered comprises the user activating a pointing device on the sub-component to be ordered in a first way, and wherein the actions further comprise selectively causing information to be displayed concerning a sub-component in the diagram in response to the user activating the pointing device on the sub-component in a second way.

10. The computer-readable storage medium of claim 9, wherein the pointing device comprises a mouse, and wherein activating the mouse in the first and second ways comprise left clicking and right clicking the mouse, respectively, or right clicking and left clicking the mouse, respectively.

11. The computer-readable storage medium of claim 9, wherein the pointing device comprises a mouse, and wherein activating the mouse in the first and second ways comprise single clicking and double clicking the mouse, respectively, or double clicking and single clicking the mouse, respectively.

12. The computer-readable storage medium of claim 1, wherein the actions further comprise selectively causing information to be displayed concerning a sub-component in the diagram in response to a user input identifying the sub-component for the first time, wherein the user input identifying the same sub-component for the second time constitutes the user selection of the sub-component to be ordered.

13. The computer-readable storage medium of claim 1, wherein the actions further comprise causing an order summary list to be displayed on the user system, the order summary list showing sub-components that have been selected to be ordered.

14. The computer-readable storage medium of claim 1, wherein the information concerning the listed sub-components comprises one or more pieces of information selected from the group consisting of:
    (a) a key number of the sub-component;
    (b) an identification number of the sub-component;
    (c) a replacement/substitute identification number of the sub-component;
    (d) a description of the sub-component;
    (e) specifications/materials of the sub-component;
    (f) a manufacturer/supplier of the sub-component;
    (g) a manufacturer identification number of the sub-component;
    (h) a stock-keeping-unit (SKU) number of the sub-component;
    (i) the quantity of the sub-component(s) used in the product;
    (j) other sub-components associated with the sub-component as part of a kit;
    (k) the price of the sub-component;
    (l) the price of the product as a whole;
    (m) the availability of the sub-component; and
    (n) available varieties of the sub-component.

15. The computer-readable storage medium of claim 1, wherein the actions further comprise selectively causing zooming in on and zooming out of the exploded view in response to a user input.

16. The computer-readable storage medium of claim 1, wherein the actions further comprise selectively causing scrolling of the exploded view in response to a user input.

17. The computer-readable storage medium of claim 1, wherein processing the selection of a sub-component to be ordered comprises submitting the order to an order entry/fulfillment system.

18. The computer-readable storage medium of claim 1, wherein processing the selection of a sub-component to be ordered comprises automatically sending the order via a network to a supplier/manufacturer.

19. The computer-readable storage medium of claim 1, wherein the actions further comprise communicating on a network, the network being selected from the group consisting of the Internet, an extranet, a local area network, a wide area network, and a wireless network.

20. The computer-readable storage medium of claim 1, wherein the actions further comprise selectively causing additional information to be displayed about one of the sub-components in response to a user input via a display window that is displayed while the user input is provided at the one sub-component in the exploded view.

21. The computer-readable storage medium of claim 1, wherein the information concerning the listed sub-components includes an indicator of which sub-components are separately replaceable.

22. The computer-readable storage medium of claim 21, wherein the indicator of which sub-components are separately replaceable comprises an order quantity box.

23. An exploded view ordering tool server, wherein the server is configured to:
    cause a list of a plurality of products to be displayed on a user system;
    receive a user selection of one of the plurality of products from the list to be viewed in an exploded view on the user system;
    cause a diagram depicting sub-components of the selected product in an exploded view to be displayed on the user system, the exploded view showing an assembly drawing of the selected product in which the sub-components are spaced apart from each other in an unassembled state, such that individual characteristics of the sub-components are visible;
    cause a materials list to be displayed on the user system while displaying the exploded view, the materials list listing the sub-components of the selected product in the exploded view together with information concerning the listed sub-components;
    receive, while the exploded view and the materials list is being displayed, a user selection from the user system of a sub-component depicted in the diagram to be ordered;

cause to be displayed in the materials list an order quantity for the selected sub-component, based on the received user selection of the sub-component;

determine whether the selected sub-component is available to be ordered;

process the selection of the sub-component to be ordered, in response to determining that the selected sub-component is available to be ordered; and inform the user to obtain the selected sub-component from another source, in response to determining that the selected sub-component is unavailable to be ordered.

24. The server of claim 23, wherein the server is further configured to selectively cause information concerning a sub-component in the diagram to be displayed on the user system in response to a user input identifying the sub-component.

25. The server of claim 24, wherein the information concerning a sub-component comprises one or more pieces of information selected from the group consisting of:
(a) a picture or photograph of the sub-component;
(b) a key number of the sub-component;
(c) an identification number of the sub-component;
(d) a replacement/substitute identification number of the sub-component;
(e) a description of the sub-component;
(f) specifications/materials of the sub-component;
(g) a manufacturer/supplier of the sub-component;
(h) a manufacturer identification number of the sub-component;
(i) a stock-keeping-unit (SKU) number of the sub-component;
(j) the quantity of the sub-component(s) used in the product;
(k) other sub-components associated with the selected sub-component as part of a kit;
(l) the price of the sub-component;
(m) the price of the product as a whole;
(n) the availability of the sub-component;
(o) available varieties of the sub-component;
(p) an order icon for ordering the sub-component; and
(q) a menu listing one or more pieces of information selected from the group consisting of information items (a)-(p) above, wherein the server is further configured to selectively cause a piece of information from the menu to be displayed in response to a user input selecting one of information items (a) through (o), or process the selection of a sub-component to be ordered in response to a user input selecting information item (p).

26. The server of claim 24, wherein the user input is carried out by a user activating a pointing device.

27. The server of claim 26, wherein activating a pointing device is selected from the group consisting of:
clicking a mouse or placing a mouse on the sub-component in the diagram;
clicking a mouse or placing a mouse over a key number of the sub-component in the diagram;
touching the sub-component or a key number of the sub-component in the diagram on a screen of the user system; and
entering an identification of the sub-component using a keyboard.

28. The server of claim 23, wherein the user selection of a sub-component to be ordered is received when the user performs a step of activating a pointing device.

29. The server of claim 28, wherein activating a pointing device is selected from the group consisting of:
clicking a mouse on or touching the sub-component in the diagram to be ordered;
clicking a mouse on or touching a key number of the sub-component in the diagram to be ordered;
clicking a mouse on or touching an order icon associated with the sub-component to be ordered; and
entering the quantity of the sub-component to be ordered using a keyboard.

30. The server of claim 29, wherein a particular technique of the user selection of a sub-component to be ordered is selectable by the user.

31. The server of claim 23, wherein the user selection of a sub-component to be ordered comprises the user activating a pointing device on the sub-component to be ordered in a first way, and wherein the server is further configured to selectively cause information to be displayed concerning a sub-component in the diagram in response to the user activating the pointing device on the sub-component in a second way.

32. The server of claim 31, wherein the pointing device comprises a mouse, and wherein activating the mouse in the first and second ways comprise left clicking and right clicking the mouse, respectively, or right clicking and left clicking the mouse, respectively.

33. The server of claim 31, wherein the pointing device comprises a mouse, and wherein activating the mouse in the first and second ways comprise single clicking and double clicking the mouse, respectively, or double clicking and single clicking the mouse, respectively.

34. The server of claim 23, wherein the server is further configured to selectively cause information to be displayed concerning a sub-component in the diagram in response to a user input identifying the sub-component for the first time, wherein the user input identifying the same sub-component for the second time constitutes the user selection of the sub-component to be ordered.

35. The server of claim 23, wherein the server is further configured to cause an order summary list to be displayed on the user system, the order summary list showing sub-components that have been selected to be ordered.

36. The server of claim 23, wherein the information concerning the listed sub-components comprises one or more pieces of information selected from the group consisting of:
(a) a key number of the sub-component;
(b) an identification number of the sub-component;
(c) a replacement/substitute identification number of the sub-component;
(d) a description of the sub-component;
(e) specifications/materials of the sub-component;
(f) a manufacturer/supplier of the sub-component;
(g) a manufacturer identification number of the sub-component;
(h) a stock-keeping-unit (SKU) number of the sub-component;
(i) the quantity of the sub-component(s) used in the product;
(j) other sub-components associated with the sub-component as part of a kit;
(k) the price of the sub-component;
(l) the price of the product as a whole;
(m) the availability of the sub-component; and
(n) available varieties of the sub-component.

37. The server of claim 23, wherein the server is further configured to selectively cause zooming in on and zooming out of the exploded view in response to a user input.

38. The server of claim 23, wherein the server is further configured to selectively cause scrolling of the exploded view in response to a user input.

39. The server of claim 23, wherein processing the selection of a sub-component to be ordered comprises submitting the order to an order entry/fulfillment system.

40. The server of claim 23, wherein processing the selection of a sub-component to be ordered comprises automatically sending the order via a network to a supplier/manufacturer.

41. The server of claim 23, wherein the server is further configured to communicate on a network, the network being selected from the group consisting of the Internet, an extranet, a local area network, a wide area network, and a wireless network.

42. The server of claim 23, wherein the server is further configured to selectively cause additional information to be displayed about one of the sub-components in response to a user input via a display window that is displayed while the user input is provided at the one sub-component in the exploded view.

43. The server of claim 23, wherein the information concerning the listed sub-components includes an indicator of which sub-components are separately replaceable.

44. The server of claim 43, wherein the indicator of which sub-components are separately replaceable comprises an order quantity box.

* * * * *